United States Patent [19]

Jerabek et al.

[11] 3,932,191

[45] Jan. 13, 1976

[54] ELECTRODEPOSITABLE COATING COMPOSITIONS CONTAINING THEREIN CELLULOSE ACETATE BUTYRATE AND HAVING IMPROVED ADHESION

[75] Inventors: Robert D. Jerabek, Glenshaw; William J. Geiger, New Kensington, both of Pa.

[73] Assignee: PPG Industries, Inc., Pittsburgh, Pa.

[22] Filed: Oct. 10, 1973

[21] Appl. No.: 405,240

Related U.S. Application Data

[62] Division of Ser. No. 123,429, March 11, 1971, abandoned.

[52] U.S. Cl. .................. 106/178; 204/181; 260/13; 260/15; 260/16; 260/17 R
[51] Int. Cl.².C08L 1/14; C08L 91/00; C25D 13/06
[58] Field of Search ............... 260/13, 17 R, 16, 15; 106/173 R, 178; 204/181

[56] References Cited

UNITED STATES PATENTS

| | | | |
|---|---|---|---|
| 2,819,983 | 1/1958 | Salo et al. | 106/173 R |
| 3,654,198 | 4/1972 | Hood et al. | 260/16 |
| 3,657,384 | 4/1972 | Yoshida et al. | 260/17 R |

*Primary Examiner*—Allan Lieberman
*Attorney, Agent, or Firm*—William J. Uhl

[57] ABSTRACT

Electrodepositable compositions containing small amounts of cellulose acetate butyrate provide coatings having excellent adhesion to the substrate and to conventional topcoat compositions, wherein said cellulose acetate butyrate has a relatively high butyryl content. The electrodepositable compositions are comprised of water dispersible acid or base solubilized synthetic vehicle resins.

3 Claims, No Drawings

ELECTRODEPOSITABLE COATING COMPOSITIONS CONTAINING THEREIN CELLULOSE ACETATE BUTYRATE AND HAVING IMPROVED ADHESION

This is a division of application Ser. No. 123,429, filed Mar. 11, 1971, now abandoned.

STATE OF THE PRIOR ART

In recent years electrodeposition has been utilized widely, as a coating method in the automotive, appliance and other similar industries. The electro-deposition process is well known and well described in the art. Generally, an aqueous bath containing the coating composition is placed in contact with an electrically-conductive anode and an electrically-conductive cathode, and upon the passage of electric current (normally direct current) between the anode and the cathode while in contact with the bath containing the coating composition, an adherent film of the coating composition is deposited, usually on the anode. The process parameters used vary widely. The voltage applied may vary from as low as, for example, 1 volt or as high as, for example, 500 volts or higher. However, typically the voltage used ranges from about 50 to about 500 volts. Generally, current demands are higher during the initial stages of deposition, but tend to decrease as the deposited film insulates the conductive anode. The anode employed may be any electrically-conductive surface, such as iron, steel, aluminum, tin, zinc, copper, chromium, magnesium, galvanized steel, phosphatized steel, as well as other metals and pretreated metals.

A wide variety of electrodepositable resins are known in the art. For example, a number of water-soluble, water-dispersible, or water-emulsifiable polycarboxylic acid resins can be electrodeposited. Some of these resins include: reaction products or adducts of a drying oil or semi-drying oil fatty acid ester with a dicarboxylic acid or anhydride; interpolymers of a hydroxyalkyl ester of an unsaturated carboxylic acid, and at least one other ethylenically unsaturated monomer; alkyd-amine vehicles, that is, vehicles containing an alkyd resin and an amine-aldehyde resin and mixed esters of resinous polyols. The electrodepositability of certain other materials, including certain waxes, natural and synthetic resins have been known in the art for some time.

Electrodepositable compositions have in many instances been used as a one-coat system, however, for many industrial applications, a topcoat is required to provide for added protection against corrosion. In the past, great difficulty has been experienced, in many cases, in obtaining good intercoat adhesion between the said primer and topcoat compositions. To resolve this problem, an intermediate sealer coat composition was usually applied. For example, one such sealer coat composition is comprised of nitrocellulose, a maleic-modified rosin resin, a chemical plasticizer, blown castor oil and zinc stearate. The proper selection of the component ratios is important to impart the desired film strength and sandability.

In other instances, the electrodeposited primer has been sanded before the topcoat was applied. Such sanding process provides for minute indentations which increase the surface area, thus providing for more contact with the topcoat.

DESCRIPTION OF THE INVENTION

Now it has been discovered that by electro-deposition of compositions containing small amounts of cellulose acetate butyrate provides coatings having excellent intercoat adhesion when most conventional topcoat compositions are subsequently applied. Although it is well known in the art that cellulose acetate butyrate can be incorporated into conventionally applied primers to give improved intercoat adhesion when topcoated with alkyl methacrylate polymers, it was not expected that such low contents of cellulose acetate butyrate would show such a significant improvement in electrodeposited compositions. Good adhesion is obtained with as little as from about ½ percent to about 5 percent cellulose acetate butyrate based on total resin solids; and the preferred range is from about ½ percent to about 2 percent based on total resin solids.

The butyryl content of the cellulose acetate butyrate plays a significant role in this invention for it is believed that the higher the butyryl content the more compatible the cellulose acetate butyrate is with the electrodepositable vehicles. Various cellulose acetate butyrates which may be used in the practice of this invention, include those having at least 25 percent of the ester units substituted with the butyryl residue. It is preferred, however, that at least 35 percent of the units be butyryl units. However, in some compositions, cellulose acetate butyrate may be utilized having less than 25 percent of the ester units substituted with the butyryl residue, although it has been found that the cellulose acetate butyrates having low butyryl content are incompatible with certain electrodepositable vehicles and thus tend to precipitate out of solution.

Since cellulose acetate butyrate is insoluble in water, it may be pre-dissolved in a suitable solvent and blended with the electrodeposition vehicle before the said vehicle is solubilized. Suitable dissolving solvents include ketones such as acetone, methyl ethyl ketone, methyl isobutyl ketone, diacetone alcohol, cyclohexane and the like; esters such as methyl acetate, ethyl acetate, isopropyl acetate, methyl cellosolve acetate, cellosolve and the like; chlorinated hydrocarbons such as methylene chloride, ethylene chloride, propylene chloride, chloroform, tetrachloroethane, carbon tetrachloride and the like; ketone-alcohol mixtures such as acetone-methanol 4:1, acetone-methanol 1:1, acetone-methanol 1:4 and the like; and chlorinated hydrocarbon-alcohol mixtures such as methylene chloride-methanol 4:1, 1:1 and 1:4, ethylene chloride-methanol 4:1, 1:1 and 1:4, and the like.

It is also possible to add the cellulose acetate butyrate to emulsified resinous compositions by selecting the proper emulsified cellulose acetate butyrate. Other methods of addition, such as the grinding of the cellulose acetate butyrate with pigment (when employed); post-adding the cellulose acetate butyrate to an electrodepositable composition which has been reduced to coating solids content; and by incorporating the cellulose acetate butyrate directly into the resin vehicle also may be employed; however, these techniques may not always be desirable, for in many cases cellulose acetate butyrate, which has either precipitated out of solution or has not been completely incorporated, has been detected upon filtration. If the cellulose acetate butyrate precipitates out of solution or is not properly incorporated, the desired adhesion is not obtained.

Generally, it is believed that since the cellulose acetate butyrate is not ionically solubilized, bur rather migrates to the desired electrode, long with the other vehicle components, when subjected to an electromotive force.

Such use of cellulose acetate butyrate in electrodepositable compositions has many other unexpected advantages. For example, cellulose acetate butyrate does not accumulate in the electrodeposition bath but coats out in substantially the same proportion that is in the bath, and on aging the cellulose acetate butyrate does not have any adverse effects on the coating parameters of the composition.

Virtually any number of electrodeposition resins known can be utilized to formulate electro-depositable compositions containing cellulose acetate butyrate; essentially any water-soluble, water-dispersible, or water-emulsifiable composition comprising vehicle resin in an aqueous medium can be so employed. The present invention is applicable to any such process.

Presently, the most widely used electro-deposition vehicle resins are synthetic polycarboxylic resinous materials. Numerous such resins are described in U.S. Pat. Nos. 3,230,162; 3,441,489; 3,422,044; 3,403,088; 3,369,983; 3,366,563. They include alkyd resins; modified or unmodified adducts of drying oil or semi-drying oil fatty ester with a dicarboxylic acid or anhydride, such as maleic anhydride adducts of linseed oil, soybean oil, or the like, modified in some cases with monomers such as styrene or polyol; acrylic polymers, such as acid-containing interpolymers of acrylic monomers, in many cases including a hydroxyalkyl ester; mixed partial esters of fatty acids with resinous polyols, such as polyols derived from epoxy resins or styrene-allyl alcohol copolymers; and others, including certain phenolic resins, hydrocarbon resins, etc. Aminoplast resins, usually made from condensation of melamine, urea, benzoguanamine or the like with formaldehyde and etherified with an alcohol such as methanol, butanol, hexanol or a mixture of alcohols, can also be employed, especially in combination with hydroxy-containing alkyd or acrylic resins.

Other base-solubilized polyacids which may be employed as electrodeposition vehicles include those taught in U.S. Pat. No. 3,392,165 wherein the acid groups rather than being solely polycarboxylic acid groups contain mineral acid groups such as phosphonic, sulfonic, sulfate and phosphate groups.

In order to produce an electrodepositable composition from such polycarboxylic acid resins, it is necessary to at least partially neutralize the acid groups present with a base in order to disperse the resin in the aqueous electrodeposition bath. Inorganic bases such as metal hydroxides, especially potassium hydroxide, can be used, as can ammonia or organic bases such as amines. Water-soluble amines are often preferred. Commonly used amines include ethylamine, diethlamine, triethylamine, diethanolamine and the like.

In addition to the vehicle resin, there may be present in the electrodepositable composition any of the conventional types of pigments employed in the art. There is often incorporated into the pigment composition a dispersing or surface-active agent. Usually the pigment and surface-active agent, if any, are ground together in a portion of the vehicle, or alone in an aqueous medium, to make a paste and this is blended with the vehicle to produce a coating composition.

In many instances, it is preferred to add to the electrodeposition bath certain additives to aid dispersibility, viscosity, and/or film quality, such as, a non-ionic modifier or solvent. There may also be included additives such as antioxidants, wetting agents, anti-foaming agents, fungicides, bactericides, and the like.

In formulating the coating composition, ordinary tap water may be employed, but where such water contains a relatively high level of metal cations, anions and other cations, deionized water, i.e., water from which free ions have been removed by the passage through ion exchange resins, is preferably employed.

The incorporation of cellulose acetate butyrate in the instant invention is also applicable to cationic type vehicle resins, that is, vehicle resins which deposit on the cathode. These include polybases solubilized by means of an acid, for example, an amine-terminated polyamide or an acrylic polymer solubilized with acetic acid. Other cationic polymers include reaction products of polyepoxides with amino-substituted boron esters and reaction products of polyepoxides with hydroxyl or carboxyl-containing amines; many such products are described in copending applications Ser. Nos. 772,366, now abandoned, and 772,353, now U.S. Pat. No. 3,619,398, both filed Oct. 31, 1968, and Ser. Nos. 840,847, now abandoned, and 840,848, now abandoned, both filed July 10, 1969, In most instances, there is no problem with compatibility of the cellulose acetate butyrate and the electrodepositable resins. In some cases, good adhesion is obtained even where there is a slight incompatibility between the electrodepositable resin and the cellulose acetate butyrate. Also, it is possible to add emulsified cellulose acetate butyrate to various electrodepositable compositions by the proper selection of emulsifying agents. The following table set forth some of the various commercially available cellulose acetate butyrate that may be employed with the compositions of the instant invention.

| Type No.[1] | Viscosity Range | | Average Acyl Content | | Color Maximum | Haze Maximum |
|---|---|---|---|---|---|---|
| | Seconds | Poises | Acetyl (Percent) | Butyryl (Percent) | (p.p.m.) | (p.p.m.) |
| EAB-272-3 | 2.4–3.6 | 9.0–13.5 | 20.5 | 26 | 175 | 35 |
| EAB-272-20 | 15–35 | 56–131 | 20.5 | 26 | 175 | 35 |
| Half-second | 0.3–0.5 | 1.28–2.08 | 13.0 | 37 | 125 | 35 |
| EAB-281-2 | 1–35 | 3.8–13.1 | 13.0 | 37 | 125 | 35 |
| EAB-381-20 | 17–33 | 64–124 | 13.0 | 37 | 125 | 35 |
| EAB-500-1 | 0.8–1.2 | 3.0–4.5 | 6.0 | 48 | 125 | 35 |
| EAB-500-5 | 4.0–6.0 | 15.0–22.5 | 6.0 | 48 | 125 | 35 |
| EAB-551-0.2 | 0.27 | | 1.6 | 53 | 60 | 10 |
| EAB-531-1 | 1–2 | | 7.8 | 50 | 100 | 20 |
| Half-second butyrate | 0.3–0.5 | 1.12–1.88 | 13 | 37 | 150 | 35 |

| Type No.[1] | Viscosity Range | | Average Acyl Content | | Color Maximum | Haze Maximum |
|---|---|---|---|---|---|---|
| | Seconds | Poises | Acetyl (Percent) | Butyryl (Percent) | (p.p.m.) | (p.p.m.) |
| EAB-500-5 | 4-6 | 15.0-22.5 | 6 | 48 | 125 | 35 |

[1]EAB - Trademark of cellulose acetate butyrate sold by Eastman Kodak Company. Viscosity - ASTM Method D-1343-56 (Formula A); Color - Platinum-Cobalt Standard; Haze - Arthur H. Thomas Fuller's Earth Standard; Acetyl and Butyryl Content - ASTM Method D-817-57

Generally, after the primer is electro-deposited, the said primer is baked before the topcoat composition is applied, however, in some cases a flash bake or air-drying may be sufficient in order to obtain the desired hardness. A wide variety of resins may be employed in formulating topcoat compositions, and generally there is a noticeable improvement in the intercoat adhesion.

A particular topcoat system, whether solvent or water-based, air-drying or baking, pigmented or unpigmented, when applied over an electrodeposited primer containing cellulose acetate butyrate, there generally is a substantial improvement in the intercoat adhesion of such systems when compared to similar top-coated electrodeposited primer without the incorporation of cellulose acetate butyrate.

The topcoat compositions of the instant invention may be comprised, for example, of an alkyl methacrylate polymer, such as the well known lacquers based on polymethyl methacrylate, or copolymers of methyl methacrylate with other monomers.

While homopolymers of an alkyl methacrylate, particularly methyl methacrylate or ethyl methacrylate, may be utilized, a particularly useful and preferred group of methyl methacrylate copolymers which may be employed in the preparation of topcoat lacquers are copolymers of methyl methacrylate with another alkyl ester of an unsaturated carboxylic acid, such as acrylic acid, methacrylic acid, itaconic acid, and the like. A description of many such compositions is set forth in U.S. Pat. No. 3,114,777.

The modifying monomer, that is, the alkyl ester of an unsaturated carboxylic acid, is preferably utilized in an amount of about 10 percent to about 30 percent by weight, although as high as 50 percent by weight of the alkyl ester may also be utilized to give copolymers which impart the desired characteristics to coating compositions.

The aldehyde-modified unsaturated carboxylic acid amide interpolymer compositions disclosed and claimed in U.S. Pat. No. 3,037,963 also may be employed in formulating topcoat compositions which are advantageously utilized over the electrodeposited primers described herein.

In the preparation of the aldehyde-modified amide interpolymer resin, a polymerizable unsaturated carboxylic acid amide is polymerized with one or more ethylenically unsaturated monomers, and the resulting interpolymer reacted with an aldehyde.

In some instances, minor amounts of other resins may be blended advantageously with such aldehyde-modified interpolymers. Examples of these other resins include alkyd resins (U.S. Pat. No. 2,940,945), epoxy resins (U.S. Pat. No. 2,870,117), vinyl halide resins (U.S. Pat. No. 2,870,116) and nitrocellulose (U.S. Pat. No. 2,940,943).

It has also been found that when the aldehyde-modified unsaturated carboxylic acid amide interpolymers are blended with an adduct of a hydroxyl-containing polymer and a carboxylic acid anhydride, low temperature curing compositions are produced.

In addition to the above-mentioned adducts, melamine-formaldehyde or urea-formaldehyde condensation products may also be used to lower the curing temperature, particularly where some carboxyl groups are present in the said aldehyde-modified interpolymers.

The adhesion of various epoxy topcoat resins to various cellulose acetate butyrate-containing, electrodeposited primers may also be promoted.

The epxoide resin which is used in the top-coat composition of this invention may vary considerably in chemical structure. These materials which are ordinarily polyglycidyl ethers of bisphenols, or polyether derivatives of polyglycidyl phenols containing epoxide groups, are formed by the reaction of bisphenols with epichlorohydrin, and range from viscous liquids to hard, brittle resins.

In addition to the epoxy resins which are prepared with a polyhydride phenol and a chloroepoxy compound, the epoxidized ring compounds such as disclosed in U.S. Pat. No. 2,716,123 may also be used.

The various polyester resins and alkyd resins may show improved intercoat adhesion when applied over cellulose acetate butyrate containing electrodeposited primers. These include the various reaction products of the dicarboxylic acids and anhydrides and the various polyols with and without long chain fatty acid esters.

All of the alkyd resins such as short oil-modified resins, medium oil-modified and long oil-modified resins generally show substantial improved adhesion when applied over cellulose acetate butyrate-containing electrodeposited primers.

The various styrene-modified alpha, beta-ethylenically unsaturated dicarboxylic acid alkyds, particularly the maleic acid type, may be used in formulating topcoat compositions to provide for improved intercoat adhesion when applied over cellulose acetate butyrate-containing electrodeposited primers.

In many instances, adhesion between acrylic lacquer topcoats and various amino-formaldehyde resins such as urea-formaldehyde and melamine-formaldehyde resins may be promoted by the presence of minor amounts of cellulose acetate butyrate in the electrodeposited primer. The fast-curing melamine-formaldehyde resins which are employed in acrylic enamel topcoats for the automotive industry are particularly adaptable when utilized in conjunction with electrodepositable primer containing cellulose acetate butyrate.

The various thermosetting compositions are prepared from blends of acid-containing vinyl resins or halide-containing vinyl resins with melamine-formaldehyde or urea-formaldehyde resins may be employed to provide for improved intercoat adhesion when topcoat formulations are applied over the primers of this invention.

Thus, most blends of the above-described epoxy, polyester, alkyd and amino-formaldehyde resins with the aforementioned unsaturated carboxylic acid amide interpolymers may be effectively formulated into topcoat compositions that show improved intercoat adhesion when applied over cellulose acetate butyrate containing electrodeposited primers. Moreover, topcoat compositions comprised of blends of the thermo-plastic acrylic polymers with the above-described interpolymers may also be employed.

The topcoat compositions may be applied by any of the processes commonly utilized in the art, for example air spraying, electrostatic spraying, dipping, flowing, curtain coating, reverse roll coating, and the like.

The topcoat compositions may be applied over a fully cured primer, however, in some instances it may be desirable to apply over a partially cured primer in order to prevent over baking the primer. It is also possible to apply the topcoat compositions over an uncured primer after substantially all of the water has evaporated from the primer.

The following examples are illustrative of compositions that may be employed in the instant invention. These examples are given by way of illustration and not by way of limitation. All parts and percentages are by weight unless otherwise specified.

The following compositions were utilized in formulation of an electrodepositable primer:

EXAMPLE I

Example I was formulated from 113.5 parts of a resin comprising 52.9 parts of tall oil fatty acid, 39.8 parts of a styrene-allyl alcohol copolymer (Shell's X-450), 1.3 parts of adipic acid, and 6.0 parts of maleic anhydride. The copolymer employed had a molecular weight of 1100 and a hydroxyl functionality of 5. The resin was cut in pentoxone and had a viscosity of 3500–4500 centipoises and an acid number between 31 – 40.

A second component employed was 9.0 parts of a phenolic resin (General Electric's Methylon 75108) which is an allyl ether of trimethylolphenol.

The cellulose acetate butyrate employed was introduced by utilizing 10.0 parts of a composition comprising 2.5 parts cellulose acetate butyrate EAB (551–0.2), 2.5 parts n-butanol, and 10.0 parts 4-methoxy-4-methyl-pentanone-2 (pentoxone).

The above components were solubilized with 4.0 parts triethylamine and 826.0 parts deionized water.

To this composition 37.5 parts of a pigment paste were added. The pigment paste was comprised of 15.13 parts of a grinding vehicle comprised of 97.56 parts maleinized oil, 1.46 diethylamine, and 0.98 parts cresylic acid; 74.77 parts (pigmentary) coal dust; 14.58 parts lead silicate; 5.77 parts manganese dioxide; 3.14 parts strontium chromate; and 1.74 parts montmorillonite clay, modified with trimethyl octyl ammonium ions and containing 0.65 percent nitrogen (Bentone 11).

Example I was deposited on a variety of zinc and iron phosphatized steel panels. The voltage employed was sufficient to obtain 0.7 to 1.0 mils dry film build. The bath temperature was maintained at 80° ±2°F. Generally, the deposited film may be completely cured by baking for 45 minutes at 325°F., however, when the primer is topcoated with a baking enamel, the baking schedule on the primer may be reduced somewhat. For example, if the topcoat should require a bake of 20 minutes at 310°F., a bake of 25 minutes at 300°F. would be sufficient in many instances.

The following composition was employed in formulating a topcoat which was applied to the abovedescribed primer, the said primer having been baked at 350°F. for 25 minutes.

A topcoat composition was formulated in the following manner:

| | Parts by Weight |
|---|---|
| Green pigment paste (below) | 0.54 |
| Blue pigment paste (below) | 9.55 |
| Red pigment paste (below) | 1.64 |
| Black pigment paste (below) | 0.94 |
| Aluminum pigment paste, 65 percent pigment solids in a high boiling aromatic hydrocarbon (Reynolds Metals Company's 8-231) | 5.20 |
| Aluminum pigment paste, 65 percent pigment solids in a high boiling aromatic hydrocarbon (Reynolds Metals Company's LSH-618) | 0.94 |
| Cellosolve acetate | 32.57 |
| High flash UM&P naphtha (Bronoco Solvents) | 25.23 |
| Aromatic hydrocarbon (Union Solvent 30) | 94.26 |
| Resin A (below) | 57.98 |
| Resin B (below) | 238.22 |
| Resin C (below) | 303.51 |
| Silicone solution (Dow-Corning - 200) | 0.44 |

The green pigment paste was comprised of 124.20 parts of phthalo green (Hilton Davis Co.); 313.43 parts of a resin comprising 39.0 parts methyl methacrylate, 13.0 parts glycidyl methacrylate, 42.0 parts polyhydroxy stearic acid and 6.0 parts p-nitro benzoic acid; and 192.11 parts xylene. The above components were ground in a steel ball until a suitable grind was obtained and then further reduced with 138.26 parts of xylene.

The phthalo blue pigment paste was comprised of 121.35 parts of phthalo blue pigment (Dupont's BT-435 D); 355.15 of the resin as utilized in the green pigment paste(above); and 197.41 parts of xylene. The above components were ground in a manner described above and finally reduced with 135.09 parts xylene.

The red pigment paste was comprised of the following 122.25 parts red pigment (Harmon Colors' Thio-Fast Red MV-6655), and 367.57 parts of the resin utilized in green pigment paste (above). The above components were ground and finally reduced with 136.09 parts xylene.

The black pigment paste was comprised of 38.65 parts black pigment (Carbolac-02), 339.15 parts of resin utilized in the green pigment paste (above) and 265.91 parts xylene. The above components were ground and finally reduced with 129.09 parts xylene.

Resin A was comprised 175.5 parts coconut oil, 106.0 parts neopentyl glycol, 0.1 litharge (powdered lead monoxide), 171.1 phthalic anhydride, 18.2 parts glyceride, 0.9 parts dibutyl tin oxide, and 112.5 parts xylene. This resin had the following characteristics:

| Solids content (percent) | 80.4 |
|---|---|
| Viscosity (Gardner-Holdt) | T |
| Acid number | 6.42 |
| Hydroxyl number | 47.90 |

Resin B was a dispersion polymer (45.8 percent solids content) comprising 90.4 percent methyl methacrylate, 0.7 percent methacrylic acid reacted with 2-hydroxyethyl ethyleneimine, 8.9 percent stabilizer (acrylic dispersion comprising methyl methacrylate, glycidyl methacrylate, methacrylic acid, polyhydroxy stearic acid, butyl acetate, ethyl acetate, and VM&P naphtha), and 54.2 percent solvents comprising Napoleum 30, heptane, hexane, 2 nitropropane, butyl acetate, ethyl acetate and high flash VM&P naphtha.

Resin C was a copolymer dispersion (48.7 percent solids content) comprising 74.8 percent methyl methacrylate, 15.6 percent butyl acrylate, 0.7 percent methacrylic acid reacted with 2-hydroxyethyl ethyleneimine, 8.9 stabilized (same as in Resin L) and 51.3 percent solvent comprising Napoleum 30, heptane, hexane, butyl acetate, ethyl acetate, high flash VM&P naphtha and 2-nitropropane.

This topcoat composition was reduced to spraying viscosity with a mixture of butyl cellosolve acetate, 2,2,4-trimethyl-1,3-pentanoldiol monoisobutyrate, and an aliphatic naphtha, and applied over the abovedescribed electrodeposited primer. The two-coat system was then baked for 20 minutes at 310°F., producing topcoat having a dry film thickness of from about 0.7 to 1.0 mils. The total film thickness of both primer and topcoat ranged from about 1.4 mils to about 2.0. All of the panels which were coated with the electrodeposited primer and the sprayed topcoat manifested excellent intercoat adhesion and adhesion to the substrates. The intercoat adhesion was tested by three different methods; the crosshatch method, the knife method and the tape method.

The crosshatch method comprises cutting a series of parallel lines about 1/16 inch apart in the coating surface and another series of parallel lines over the area, but perpendicular to the first set of parallel lines. The amount of chipping observed is a measure of the adhesion.

The knife method comprises gouging a groove into the surface of the coating with the flat top of the knife and observing the manner in which the coating is removed. If the adhesion is poor, the topcoat will break freely away from the primer.

The tape method comprises cutting an "X" in the surface of the coating with a knife, adhering a pressure-sensitive tape against the X surface and removing the said tape in a rapid motion almost parallel to the plane of the surface. The amount of coating which comes off with the tape is also a measure of the adhesion of the coating system. In addition to significant improvements in intercoat adhesion, it was noted that in many cases substantial promotion of primer to substrate adhesion was obtained.

Various other film properties showed desirable improvements, for example, direct and reverse impact, humidity resistance and the like.

Similarly, the topcoat composition as hereinabove described was applied to electrodepositable primers similar to Example I excepting for a revision in the cellulose acetate butyrate content (1 and 2 percent based on resin solids) and tested with equally desirable results.

EXAMPLE II

A red electrodeposited primer comprising essentially the same components as Example I except for the (pigmentary) coal dust which was replaced with a red iron oxide pigment, also evidenced adhesion promotion when topcoated in the manner described above. The two-coat composition was evaluated with an electrodeposited control primer, without any cellulose acetate butyrate, which was topcoated with the composition of Example I.

The various electrodepositable resins topcoat compositions and components may be substituted or replaced to provide desirable results.

For example, the electrodepositable resin may be an alkyd resin; this is, a modified or unmodified adduct of a drying oil or semi-drying oil fatty acid ester with a dicarboxylic acid or anhydride; an acrylic polymer such as an acid-containing interpolymer of acrylic monomers; or cationic vehicles such as amime-terminated polyamides. Likewise, amino-formaldehyde resins such as hexakis(methoxymethyl)melamine, ethoxymethoxymethyl melamine, N,N'-dimethyl urea, benzyl urea, benzoguanamine, and the like may be used in the topcoat formulation or electrodeposition bath composition.

Pigment components are readily manipulated to change color, gloss, texture and protective characteristics in both the primer and topcoat compositions.

Although specific examples have been set forth, hereinabove, it is not intended that the invention be limited solely thereto, but includes all of the variations and modifications falling within the scope of the appended claims.

We claim:

1. An aqueous electrodepositable composition comprising an ionically solubilized water-dispersed vehicle selected from the class consisting of a base solubilized synthetic polycarboxylic acid resin vehicle and an acid solubilized polybasic resin vehicle and from about 0.5 to about 2 percent by weight, based on the total weight of resinous vehicle solids of cellulose acetate butyrate which has at least 25 percent by weight of the ester units substituted with the butyryl residue.

2. The composition of claim 1 wherein said ionically solubilized water-dispersed vehicle comprises a base-solubilized synthetic polycarboxylic acid resin vehicle.

3. The composition of claim 2, wherein said polycarboxylic acid resin vehicle is a maleinized drying oil fatty acid ester.

* * * * *